United States Patent [19]

McKendrick

[11] 3,837,432

[45] Sept. 24, 1974

[54] LUBRICATION SYSTEM FOR PNEUMATIC DEVICE

[76] Inventor: Lorne J. McKendrick, 5131 Surfwood Dr., Milford, Mich. 48042

[22] Filed: Feb. 26, 1973

[21] Appl. No.: 335,508

[52] U.S. Cl.................. 184/7 D, 92/154, 184/18, 184/55 R, 184/6.24
[51] Int. Cl............................................. F16n 7/30
[58] Field of Search.......... 184/6 R, 7 R, 7 D, 6.24, 184/18, 55 R, 55 A, 56 R, 56 A, 6.26; 92/153, 154; 55/464, 465

[56] References Cited
UNITED STATES PATENTS

| | | |
|---|---|---|
| 1,773,073 | 8/1930 | Beach .............................. 55/464 X |
| 2,698,604 | 1/1955 | Edwards ......................... 92/154 X |
| 2,894,599 | 7/1959 | Leininger......................... 55/464 X |
| 3,112,013 | 11/1963 | Tine.............................. 184/55 A X |
| 3,186,513 | 6/1965 | Dunn et al...................... 184/6.24 X |
| 3,556,123 | 1/1971 | Smith............................. 184/7 D X |
| 3,604,534 | 9/1971 | Whitaker ......................... 184/7 R |

*Primary Examiner*—Manuel A. Antonakas
*Attorney, Agent, or Firm*—Hauke, Gifford, Patalidis & Dumont

[57] ABSTRACT

A pneumatic cylinder is actuated by an air supply system having means for introducing a mist of lubricating oil into the input air being delivered to the cylinder, and means for filtering the output air being exhausted from the cylinder to recover and recirculate the lubricant into the input air.

11 Claims, 2 Drawing Figures

3,837,432

LUBRICATION SYSTEM FOR PNEUMATIC DEVICE

BACKGROUND OF THE INVENTION

This invention relates to systems for lubricating pneumatic devices, and more particularly to a system in which a lubricating oil is recirculated in the pressurized air that actuates the device.

There are many industrial applications for pneumatic devices, such as air cylinders, in which it is desirable to lubricate a moving power member such as a piston. Some systems for providing such lubrication introduce an oil mist into the input air being delivered through a conventional air hose. However, the adhesive characteristics of oil causes it to cling to the internal wall of the hose. When only a single air hose is connected to the end of a pneumatic cylinder, both the air delivered to the cylinder to provide a power stroke of the piston, and the air discharged from the cylinder move along the same path.

The air for producing a power stroke has a relatively slow velocity due to the rapid pressure increase in the cylinder, whereas on the piston's retracting stroke the air is usually vented to atmosphere at a relatively high velocity. Thus, in a continuously cycling system, the particles in the oil mist usually move only a few inches downstream from the lubricating device before settling out in the hose. When the cylinder is vented to the atmosphere, the exhaust air carries the bulk of the oil into the atmosphere thereby polluting the environment in which the cylinder is being operated. Each subsequent cycle introduces new oil into the system which in turn is discharged to the atmosphere. Previous systems have also been quite noisy in operation.

One prior art solution to the problem of lubricating pneumatic cylinders has been to provide individual input and output air hoses. Instead of reversing the path of motion of the air during each piston cycle, the air moves in only a single direction in each hose. Such an arrangement is illustrated in U.S. Pat. No. 2,698,604 which issued to R. L. Edwards. Although such a system increases the amount of lubricant reaching the pneumatic cylinder, the output air still delivers lubricant to the atmosphere and the system is noisy during operation.

SUMMARY OF THE INVENTION

The broad purpose of the present invention is to provide a pneumatic system having means for introducing a lubricant into the input air being delivered to a pneumatic device, and means for removing such lubricant from air being exhausted from the device for recirculation to the input air.

A system embodying the invention has several special advantages for industrial applications. For example, there is less pollution of the environment in which the system operates because the oil is not discharged to the atmosphere. In addition, the lubricant is continually recirculating in the system thereby insuring that the pneumatic device is being continually lubricated. Further, the lubricating device requires less refilling and the pneumatic device receives a precise and controlled amount of lubricant as it is being operated. Means are also provided to muffle the noise of the system so that it is much quieter in operation than previous systems of this kind. These and other advantages of the invention will become more readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which.

DESCRIPTION OF THE PREFERRED EMBODIMENTS

Figure 1:
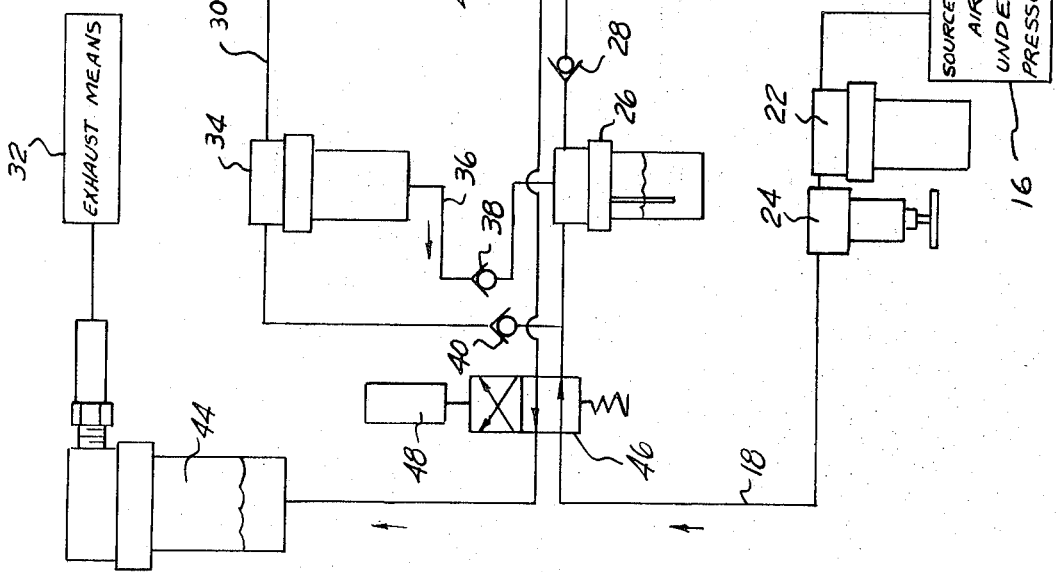
FIG. 1 is a diagrammatic illustration of a lubricating system for a pneumatic device illustrating the preferred embodiment of the invention.

Referring to the drawings, FIG. 1 illustrates the preferred system as comprising a double acting air cylinder 10 having a chamber 12. A piston 14, which functions as a power member, is slidably mounted in chamber 12 for reciprocating motion.

A source of air under pressure 16 is connected by conduit 18 to an appropriate opening 20 of chamber 12. Conduit 18 is adapted to deliver air under pressure to chamber 12 to bias piston 14 in a power stroke. An air filter 22 and a pressure regulator 24 are connected in conduit 18 adjacent source 16 to provide filtered air at an appropriate pressure to chamber 12.

A lubricating device 26 is connected in conduit 18 for introducing a mist of oil into the air being delivered to chamber 12 so that piston 14 moves in a lubricated sliding motion. A check valve 28 is connected in conduit 18 between lubricating device 26 and chamber 12 to prevent the air from moving in a reverse direction toward lubricating device 26. Thus, the oil suspended in the input air always moves in the same direction regardless of the direction of piston motion.

A second, output conduit 30 has one end connected to chamber opening 20 and its opposite end connected to input conduit 18 adjacent lubricating device 26. Conduit 30 is adapted to pass air from chamber 12 to input conduit 18 for discharge to exhaust means 32. Exhaust means 32 may be the atmosphere. A reclassifier 34 is connected in conduit 30 for filtering oil particles from the air being discharged from chamber 12 to exhaust means 32. The filtered oil is returned by conduit 36 to lubricating device 26 for recirculation to the input air. A check valve 38 in conduit 36 prevents the oil from flowing toward the reclassifier 34. Another check valve 40 is connected in conduit 30 adjacent its connection to conduit 18 to prevent the reverse flow of air from conduit 18 toward reclassifier 34 and chamber 12.

A third conduit 42 has one end connected to chamber 12 on the side of piston 14 opposite opening 20, and its opposite end connected to the exhaust means 32. A silencer filter device 44 is connected in conduit 42 adjacent exhaust means 32. Silencer device 44 reduces the noise level of exhausting air and also filters any residual oil in the air being discharged toward exhaust means 32.

Control valve means 46 is connected in conduit 18 and conduit 42 so as to be movable between a pair of alternate positions by a solenoid 48. In its first position, illustrated in FIG. 1, control valve 46 connects source 16 to chamber 12 on one side of piston 14, and connects the opposite side of the piston 14 to exhaust means 32 to bias the piston 14 towards a retraction stroke. In the alternate position of control valve 46, source 16 and exhaust means 32 are connected to opposite ends of chamber 12 to bias the piston in a power stroke.

Thus by moving control valve 46 between its alternate positions, piston 14 is reciprocated in lubricated motion in chamber 12. As this cycle is taking place, an oil mist is introduced by lubricating device 26 into the input air being delivered to the piston rod side of piston 14. Oil carried in the air discharged from chamber 12 is filtered by reclassifier 34 and recirculated through conduit 36 to lubricating device 26.

Figure 2:
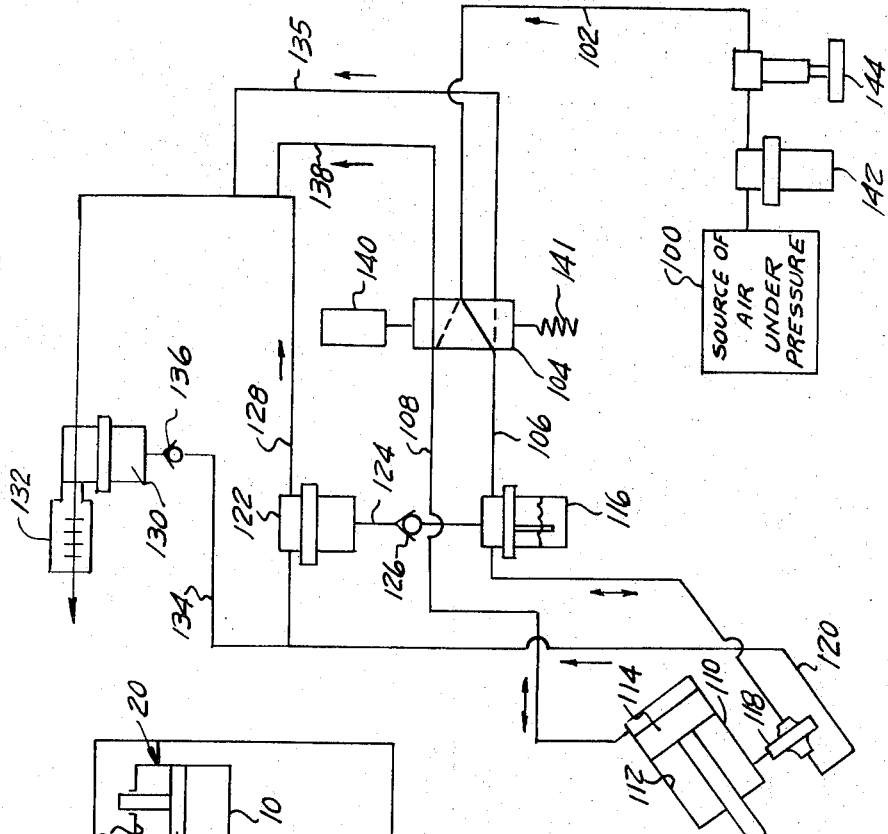
FIG. 2 is a diagrammatic illustration of a modified form of the invention.

A modified form of the invention, illustrated in FIG. 2, comprises a source of air 100 connected by an input conduit 102 to control valve 104. A pair of conduits 106 and 108 each have one end connected to control valve 104 and their opposite ends connected to opposite sides of a power cylinder 110 having a chamber 112. A piston 114 is reciprocally mounted in chamber 112.

A lubricating device 116 is connected in conduit 106 for delivering a mist of oil into the air being delivered through a non-reversing valve 118 into chamber 112 as the piston is being moved in a retraction stroke. Another conduit 120 passes the air from the rod side of piston 114 as it is being moved in a power stroke. The discharging air is delivered through a first oil reclassifier 122 which filters oil being carried by the air. The filtered oil is returned through a conduit 124 to lubricating device 116 for recirculation to power cylinder 110. A check valve 126 prevents reverse flow of the oil through conduit 124. The filtered air then passes through a conduit 128 to a second reclassifier 130 and from there is exhausted through a silencer 132. The silencer 132 provides means for reducing the noise level of the exhausting air. Oil removed from the air is returned to the conduit 128 upstream of the first reclassifier 122 by a conduit 134. A check valve 136 in conduit 134 prevents reverse flow through the second reclassifier 130.

It is to be noted that in this system the air filtered by reclassifier 122 is not connected to the inlet conduit as in FIG. 1, but is connected through a second reclassifier 130 before being exhausted through the silencer 132. A portion of the air being discharged from the rod side of the piston 114 is returned through conduit 106 and then passed to the second reclassifier 130 through conduit 135 and 128. The air in chamber 112 on the side of piston 114 opposite valve 118, is received from conduit 102 through a control valve 104 and a conduit 108, and then is discharged through conduit 108 control value 104 and discharge conduits 138 and 128 to the reclassifier 130 and silencer 132.

To produce a reciprocating motion of piston 114, a solenoid 140 and a bias member 141 are adapted to move control valve 104 between a pair of alternate positions. In the valve position illustrated in solid lines in FIG. 2, the input air is delivered through conduit 102, to conduit 106 to pick up an oil mist from lubricating device 116. The air and oil are then received in chamber 112 to bias piston 114 as the air on the opposite side of the piston is being exhausted through conduits 108, 138 and 128 to exhaust. In the alternate position of control valve 104 illustrated in broken lines in FIG. 2, air is removed from chamber 112 through conduits 120 and 106 toward exhaust while air is being introduced on the opposite end of the chamber from conduit 102 through conduit 108. Thus, by moving the control valve 104 between its alternate positions the piston 114 can be moved in a lubricated, reciprocating motion. A filter 142 and a regulator 144 provide filtered air at a controlled input pressure to the power cylinder.

The two stage reclassification system illustrated in FIG. 2 insures that the air that is finally exhausted will be substantially free of oil particles.

Having described my invention, I claim:

1. Pneumatic apparatus comprising:
   means providing a chamber having opening means for passing air;
   a source of air under pressure, and a first conduit connecting said source to the opening means for passing air into the chamber;
   exhaust means and a second conduit connecting the exhaust means to the opening means for passing air from the chamber;
   reclassifier means connected to the second conduit for removing oil from air being passed therethrough from the chamber and for returning such oil to the source of lubricating oil;
   power means disposed in the chamber so as to be biased toward lubricated motion in a first direction as air is being received into the chamber from the first conduit, and to be biased in the opposite direction as air is being removed from the chamber through the second conduit; and
   a third conduit connected to the chamber on the opposite of the power means as the first conduit, the third conduit being connected to the source of air under pressure for biasing the power means in said opposite direction.

2. Pneumatic apparatus as defined in claim 1, including valve means connected to said first and third conduits, the valve means being movable toward either a first position or a second position, and wherein the power means is biased either toward said first direction or toward said second direction depending upon the position of the valve means.

3. Pneumatic means as defined in claim 1, including a first valve connected in the first conduit for blocking air flow therethrough at such times as air is being removed from the chamber through the second conduit.

4. Pneumatic means as defined in claim 1, including a valve connected in the second conduit for blocking air flow therethrough as air is being received into the chamber from the first conduit.

5. Pneumatic apparatus comprising:
   means providing a chamber having opening means for passing air;
   a power member movably mounted in the chamber;
   a source of air under pressure, and a first conduit connecting said source to the opening means for passing air into the chamber to bias the power member in a first direction;
   a source of lubricating oil connected to the first conduit for passing oil therethrough to the chamber as air is being received therein, and a valve connected in the first conduit between the source of lubricating oil and the chamber to prevent oil from returning from the chamber through the first conduit;

a second conduit connected to the chamber for removing air and oil from the chamber received through the first conduit;

reclassifier means connected to the second conduit for removing oil from air passing through the second conduit, and for returning such oil to the source of lubricating oil;

a valve connected in the second conduit for preventing air from passing through the second conduit toward said chamber;

a third conduit connecting the source of air to the chamber for biasing the power member in a second direction;

exhaust means; and valve means having a first position and a second position, the valve means being operative in the first position for connecting the first conduit to the source of air and the third conduit to the exhaust means, and in the second position for connecting the first and second conduits to the exhaust means and the third conduit to the source of air whereby the power member is moved in lubricated reciprocating motion as the valve means is moved between said first position and said second position.

6. Pneumatic apparatus comprising:

means providing a chamber having opening means for passing air;

a power means movably disposed in the chamber;

a source of air under pressure;

a first conduit connecting the source of air to the opening means for passing air into the chamber to bias the power means towards motion in a first direction;

a source of lubricating oil connected to the first conduit for introducing oil into the air being received in the chamber;

a valve means;

a second conduit connecting the exhaust means to the opening means for passing air from the chamber;

reclassifier means connected to the second conduit for removing oil from air being passed therethrough from the chamber and for returning such oil to the source of lubricating oil; and means attached to said apparatus for biasing the power means towards motion in a second direction opposite said first direction thus to allow the power means to be biased toward motion in the first direction as air is being received into the chamber from the first conduit and to be biased in the opposite direction as air is exiting the chamber through the second conduit.

7. A pneumatic apparatus as defined in claim 6, wherein said means for biasing the power means toward motion in said second direction comprises a third conduit connected to the chamber on the side of the power means opposite the first conduit, said third conduit being connected to the source of air under pressure for biasing the power means in the second direction.

8. A pneumatic apparatus as defined in claim 7 and including valve means for opening said third conduit to said exhaust means, and said exhaust means including a filter and a silencer.

9. A pneumatic apparatus as defined in claim 7, and in which said third conduit is connected with said classifier means.

10. A pneumatic apparatus as defined in claim 6 and in which said second conduit is connected to said first conduit upstream of said source of lubricating oil.

11. A pneumatic apparatus as defined in claim 6 and including a second reclassifier means connected in series by said second conduit with said first mentioned classifier means.

* * * * *